(12) United States Patent
Tanaka et al.

(10) Patent No.: US 7,024,698 B2
(45) Date of Patent: Apr. 4, 2006

(54) PORTABLE INFORMATION PROCESSING DEVICE HAVING DATA EVACUATION FUNCTION AND METHOD THEREOF

(75) Inventors: Atsushi Tanaka, Moriguchi (JP); Osamu Kamo, Kobe (JP); Masaki Mukai, Nishinomiya (JP); Osamu Sameshima, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 724 days.

(21) Appl. No.: 09/843,030

(22) Filed: Apr. 27, 2001

(65) Prior Publication Data

US 2002/0162011 A1  Oct. 31, 2002

(51) Int. Cl.
*G06F 1/26* (2006.01)
*G06F 11/00* (2006.01)
*G08B 13/00* (2006.01)
*G08B 21/00* (2006.01)
*G08B 29/00* (2006.01)

(52) U.S. Cl. .......................... 726/26; 726/34; 713/165; 713/194

(58) Field of Classification Search .............. 380/256; 713/200, 155, 165; 340/572.4; 726/26, 726/34, 35, 36
See application file for complete search history.

(56) References Cited

U.S. PATENT DOCUMENTS

| | | | | |
|---|---|---|---|---|
| 5,748,084 A | * | 5/1998 | Isikoff | ...................... 340/568.1 |
| 6,356,196 B1 | * | 3/2002 | Wong et al. | ................. 340/571 |
| 6,480,096 B1 | * | 11/2002 | Gutman et al. | ............ 340/5.31 |

FOREIGN PATENT DOCUMENTS

JP    2001-028782    1/2001

* cited by examiner

*Primary Examiner*—Gilberto Barron, Jr.
*Assistant Examiner*—Samson Lemma
(74) *Attorney, Agent, or Firm*—McDermott Will & Emery LLP

(57) ABSTRACT

A processor means is connected with other individual means, and controls those individual means. Storage means stores data to be processed by the processor means and the resultant data after the process. An important data in the storage means is transmitted to other devices for evacuation by using a wireless communication means, when a situating condition of a portable information-processing device is judged abnormal (e.g., when being stolen) based on an output of a status detector means. The data in the storage means is deleted, when the transmission is completed or the transmission is interrupted. Protection of the data and the confidentiality are thus achieved even if the portable information-processing device is stolen, since the data can be evacuated, and the data is erased after completion of the data evacuation or if the data evacuation becomes not attainable.

18 Claims, 6 Drawing Sheets

PORTABLE INFORMATION PROCESSING DEVICE HAVING DATA EVACUATION FUNCTION AND METHOD THEREOF

BACKGROUND OF THE INVENTION

1. Field of the Invention

The present invention relates to a portable information-processing device having data evacuation function, and a method of evacuating data of the portable information-processing device.

2. Description of the Related Art

A portable information-processing device of the prior art, if stolen, will also result in a loss of important data.

To cope with the above, a portable information-processing device disclosed in Japanese Patent Laid-open Publication No. 2001-28782 deletes information in a memory within the device, if the device is detected locating outside of a predetermined area, e.g., beyond a region of the radio communications. However, the portable information-processing device also deletes the information, even when the user inadvertently takes it out to an area outside of the communication region. In addition, the important data will be lost in any event, although the confidentiality will be kept against theft because the data will be deleted.

SUMMARY OF THE INVENTION

The present invention is devised in consideration of the above example of the prior art. A portable information-processing device of this invention comprises a processor means, a first storage means, a first wireless communication means, and a status detector means for detecting a situating condition of the portable information-processing device. The processor means judges as to whether the situating condition of the portable information-processing device is normal or abnormal based upon an output information of the status detector means. When the processor means judges that a situating condition of the portable information-processing device is abnormal, the first wireless communication means transmits data stored in the first storage means to a preappointed device.

Further, a method of evacuating data of the portable information-processing device of the present invention comprises (a) a step of detecting information of a situating condition of the portable information-processing device, (b) a step of judging whether the situating condition is normal or abnormal according to the information of situating condition detected in the step (a), and (c) a step of transmitting over-the-air the data stored in the storage means of the information-processing device to the preappointed device, if there is judged abnormal in the step (b).

DESCRIPTION OF THE PREFERRED EMBODIMENTS

Preferred embodiments of the present invention will be described hereinafter in detail with reference to the accompanying drawings.

(First Exemplary Embodiment)

Figure 1:
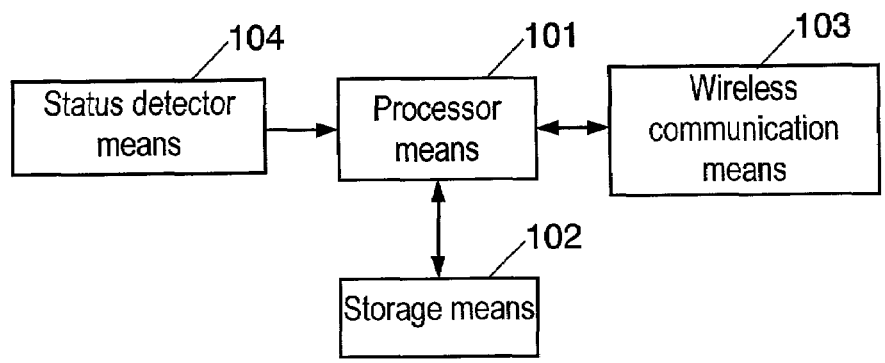
FIG. 1 is a general block diagram of a portable information-processing device of a first exemplary embodiment of the present invention.

FIG. 1 is a general block diagram of a portable information-processing device relative to a first exemplary embodiment of the present invention.

In FIG. 1, a processor means 101 is connected with a storage means 102, a wireless communication means 103, and a status detector means 104, and it controls these individual means. The storage means 102 stores data to be processed by the processor means 101, and the resultant data after the process. The wireless communication means 103 carries out radio communications with other information processing devices. The status detector means 104 detects and outputs a situating condition of the portable information-processing device. The processor means 101 makes a judgement as to whether a situating condition of the portable information-processing device is in normal situation or abnormal situation based on an output of the status detector means 104. This judgement leads to a determination as to whether the portable information-processing device is in such a situation as being stolen.

Figure 2:
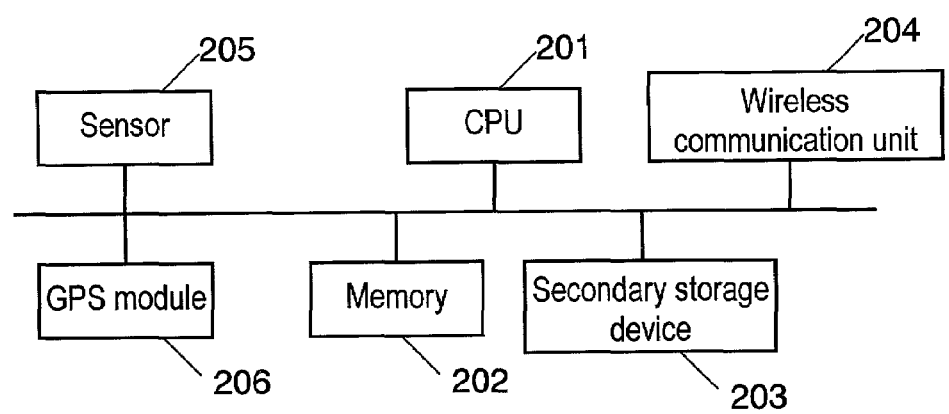
FIG. 2 is a block diagram showing a configuration of the portable information-processing device of the first exemplary embodiment of the invention.

FIG. 2 is a block diagram of the portable information-processing device of this first exemplary embodiment of the invention.

The processor means 101 is comprised of a CPU 201. Both a memory 202 and a secondary storage device 203 compose the storage means 102. The memory 202 temporarily stores codes to be processed by the CPU 201 and the resultant data after the process. The secondary storage device 203 is comprised of such a device as a HDD and a flash memory, and it stores the processed data and the like for a long-term basis.

A wireless communication unit 204 defining the wireless communication means 103 carries out radio communications with other information-processing devices (not shown in the figure). In this exemplary embodiment, the technique of IEEE 802.11, for instance, may be used for the radio communications.

A sensor 205 and a GPS module 206 compose the status detector means 104. The sensor 205 comprises an acceleration sensor, a vibration sensor, and an inclination sensor, although they are not show in the figure. The sensor 205 detects a change in acceleration impressed on the portable information-processing device itself, own vibration of the portable information-processing device, and a change in inclination of the portable information-processing device itself. Any sensors of ordinary type are useful for these sensors. The GPS module 206 measures and determines a location of the portable information-processing device using a satellite. An ordinary method of the GPS (Global Positioning System) is useful for the GPS module 206.

Figure 3:
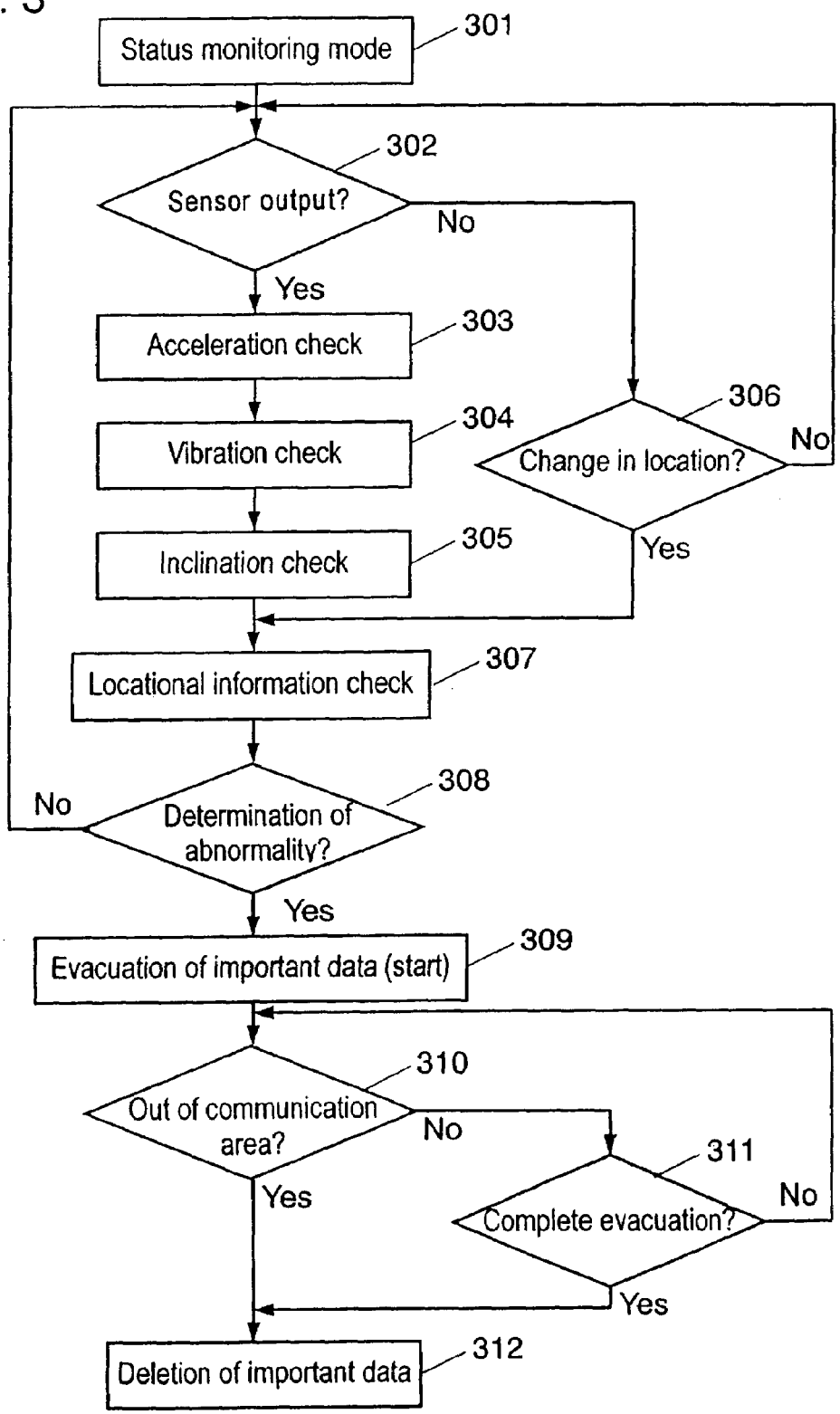
FIG. 3 is a flowchart depicting a process of the portable information-processing device of the first exemplary embodiment of the invention.

FIG. 3 is a flowchart representing process of the portable information-processing device relative to this first exemplary embodiment of the invention. This exemplary embodiment will be described hereinafter according to the flow chart shown in FIG. 3.

Step 301: The portable information-processing device goes into a status monitoring mode for judging a situating condition of its own as to whether it is normal or abnormal. The status monitoring mode may be initiated by the user choosing a mode selection of the portable information-processing device, or the portable information-processing device may be in the status monitoring mode from the initial setup. In the status monitoring mode, the portable information-processing device activates the sensor 205 and the GPS module 206, and the CPU 201 monitors outputs of the sensor 205 and the GPS module 206.

Step 302: The CPU 201 determines if there is an output of the sensor 205. When the CPU 201 detects an output of the sensor 205, process of the steps 303 through 305 are executed. If no output is detected, there goes into the step 306.

Steps 303 through 305: An output of the acceleration sensor, an output of the vibration sensor, and an output of the inclination sensor are checked at each of these steps. It then moves on to the next step 307.

Step 306: A locational information output by the GPS module 206 is verified. If there is no change in location of the portable information-processing device, there goes back to the step 302, and continues monitoring the sensor 205 and the GPS module 206. If a location of the portable information-processing device has changed, it proceeds to the step 307.

Step 307: After checking the locational information outputs by the GPS module 206, it proceeds to the step 308.

Step 308: Judgement is made for the situating condition of the portable information-processing device as to whether it is currently normal or abnormal based on a check result of the outputs of the sensor 205 and the check result of the locational information output by the GPS module 206. In checking the acceleration, vibration, and change in inclination, judgments are made as to whether or not they exceed presumed ranges. In checking the locational information, judgement is made as to whether the information-processing device has been moved beyond a presumed area. Determination as to whether the situating condition of the portable information-processing device is normal or abnormal is made accordingly based upon results of these judgements.

It then goes back to the step 302 if determined normal, or proceeds to the subsequent step 309 if determined abnormal.

Step 309: There begins transmission, through the wireless communication unit 204 to other pre-assigned devices, of important data determined based on additional information such as priority information and range information pre-set by the user among the data stored in the memory 202 and the secondary storage device 203. That is, the data evacuation begins.

In this embodiment here, a priority level is added to an individual file as the priority information according to, for instance, newness of a time stamp of the file, if file system is used for the data management system of the portable information-processing device. In addition, a range information is added to, for example, a certain file or every file in a certain directory.

Step 310: A status of the transmission is observed in this step 310.

If the evacuation is unable to be initiated, or when the transmission is interrupted in the midst of the evacuation in the step 309, there proceeds to step 312. In one instance, a condition of the radio communication is checked, and it proceeds to the step 312 if the destination device is found located outside of the communication range.

Step 311: There proceeds to step 312 when the evacuation is completed, or goes back to the step 310 if the evacuation is still in progress.

Step 312: The data in the memory 202 and the secondary storage device 203 are deleted. In this instance, only the important data may be deleted instead of deleting all data in the memory 202 and the secondary storage device 203.

There are other possible ways to constitute the radio communications between the portable information-processing device of this exemplary embodiment and the other information-processing devices used for the data evacuation destinations, including direct communications, communications via an access point, and communications via a wireless public network. For the confirmation of transmission status in the step 310, it is suitable to use a condition that a location of the access point is outside of the communication range in the case of communications via the access point, or that it is outside of a base station of the wireless public network in case of communications via the wireless public network. Furthermore, it may be possible to make any configuration via wireless means or transmission cables for connections between the access point and the other information-processing devices in the case of using the access point, and connections between the other information-processing devices and the wireless public network when using the wireless public network.

(Second Exemplary Embodiment)

In a second exemplary embodiment, a portable information-processing device takes a configuration of wireless display PC (Personal Computer).

Figure 4:
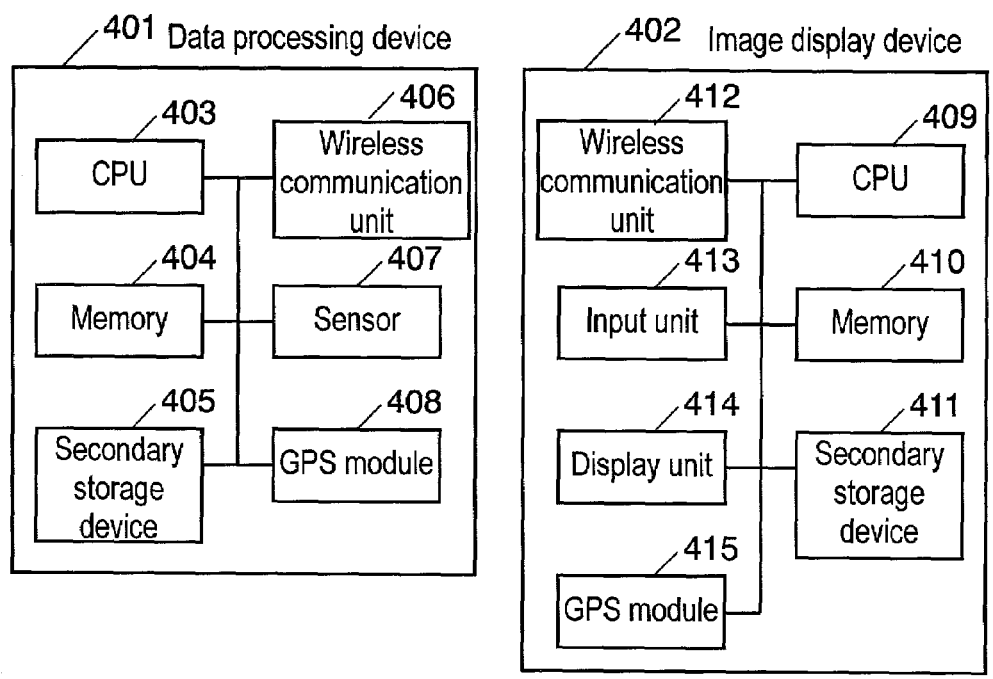
FIG. 4 is a block diagram showing a configuration of a wireless display personal computer of a second exemplary embodiment of the present invention.

FIG. 4 is a diagram showing a configuration of the portable information-processing device, i.e., a wireless display PC, related to the second exemplary embodiment of this invention.

In FIG. 4, a data-processing device 401, which is a base unit of the wireless display PC, actually processes data and produces an image data as a result of the processing. An image display device 402 serving as a portable terminal for the wireless display PC receives the image data produced by the data-processing device 401 over-the-air, and displays it.

A CPU 403 defining a processor means of the data-processing device 401 is connected with a memory 404, a secondary storage device 405, a wireless communication means 406, a sensor 407, and a GPS module 408, and controls them. The memory 404 and the secondary storage device 405 serve as storage means of the data-processing device 401, and temporarily store data to be processed by the CPU 403 and resultant data after the process. The memory 404, in particular, temporarily stores codes to be processed by the CPU 403 and the processed data. The secondary storage device 405 is comprised of such a device as a HDD and a flash memory, and it stores the processed data and the like for a long-term basis.

The wireless communication unit 406 defining a wireless communication means of the data-processing device 401 carries out radio communications with the image display device 402. In this exemplary embodiment, the technique of IEEE 802.11, for instance, may be used for the radio communications.

The sensor 407 and the GPS module 408 serve as status detector means for detecting and outputting a situating condition of the data-processing device 401. The sensor 407 comprises an acceleration sensor, a vibration sensor, and an inclination sensor, although they are not show in the figure. The sensor 407 detects a change in acceleration impressed on the portable information-processing device itself, vibration of the portable information-processing device itself, and a change in inclination of the portable information-processing device. Any sensors of ordinary type are useful for these various sensors. The GPS module 408 measures and determines a location of the portable information-processing device using a satellite. An ordinary method of the GPS is useful for this GPS.

The CPU 403 judges whether a situating condition of the data-processing device 401 is in a normal situation or an abnormal situation according to an output of the status detector means. It can be determined from the above judgement as to whether or not the data-processing device 401 is in a situation of, for instance, being stolen.

A CPU 409 serves as a processor means of the image display device 402. The CPU 409 is connected with a memory 410, a secondary storage device 411, a wireless communication unit 412, an input unit 413, a display unit 414, and a GPS module 415, and controls them. The memory 410 and the secondary storage device 411 represent storage means of the image display device 402, and they store data to be processed as well as the resultant data processed by the CPU 409. The memory 410, in particular, temporarily stores codes to be processed by the CPU 409 and the data resulted from the process. The secondary storage device 411 is comprised of a flash memory or the like, and it stores the processed data and so on for a long-term basis.

The wireless communication unit 412 serves as a wireless communication means of the image display device 402, and it carries out radio communications with the data-processing devices 401. The input unit 413 is comprised of a touch panel and buttons for use by a user to input for operation of the wireless display PC.

The display unit 414 comprised of an LCD, and the like, displays a screen image produced in the data-processing device 401 and transmitted over-the-air to the image display device 402, and a warning image and the like produced within the image display device 402.

The GPS module 415 is a location survey means for the image display device side, and it detects a location of the image display device 402.

Figure 5:
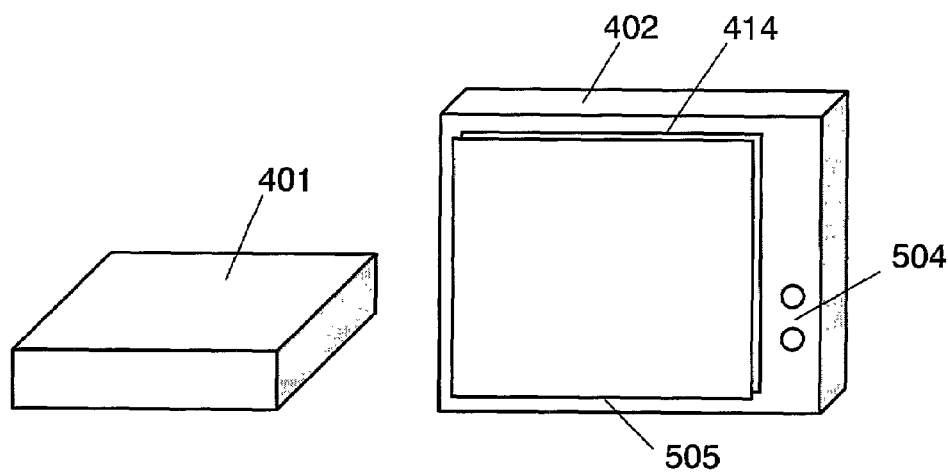
FIG. 5 is an illustration depicting a general view of the wireless display personal computer of the second exemplary embodiment of the invention.

FIG. 5 is an illustration depicting a general view of the wireless display PC representing a portable information-processing device of the second exemplary embodiment of this invention.

As shown in FIG. 5, the image display device 402 representing the portable terminal in this exemplary embodiment has the display unit 414, operating buttons 504 to be manipulated by the user, and a touch panel 505, disposed to its front surface as viewed outwardly. The operating buttons 504 and the touch panel 505 compose the input unit 413.

Figure 6A:
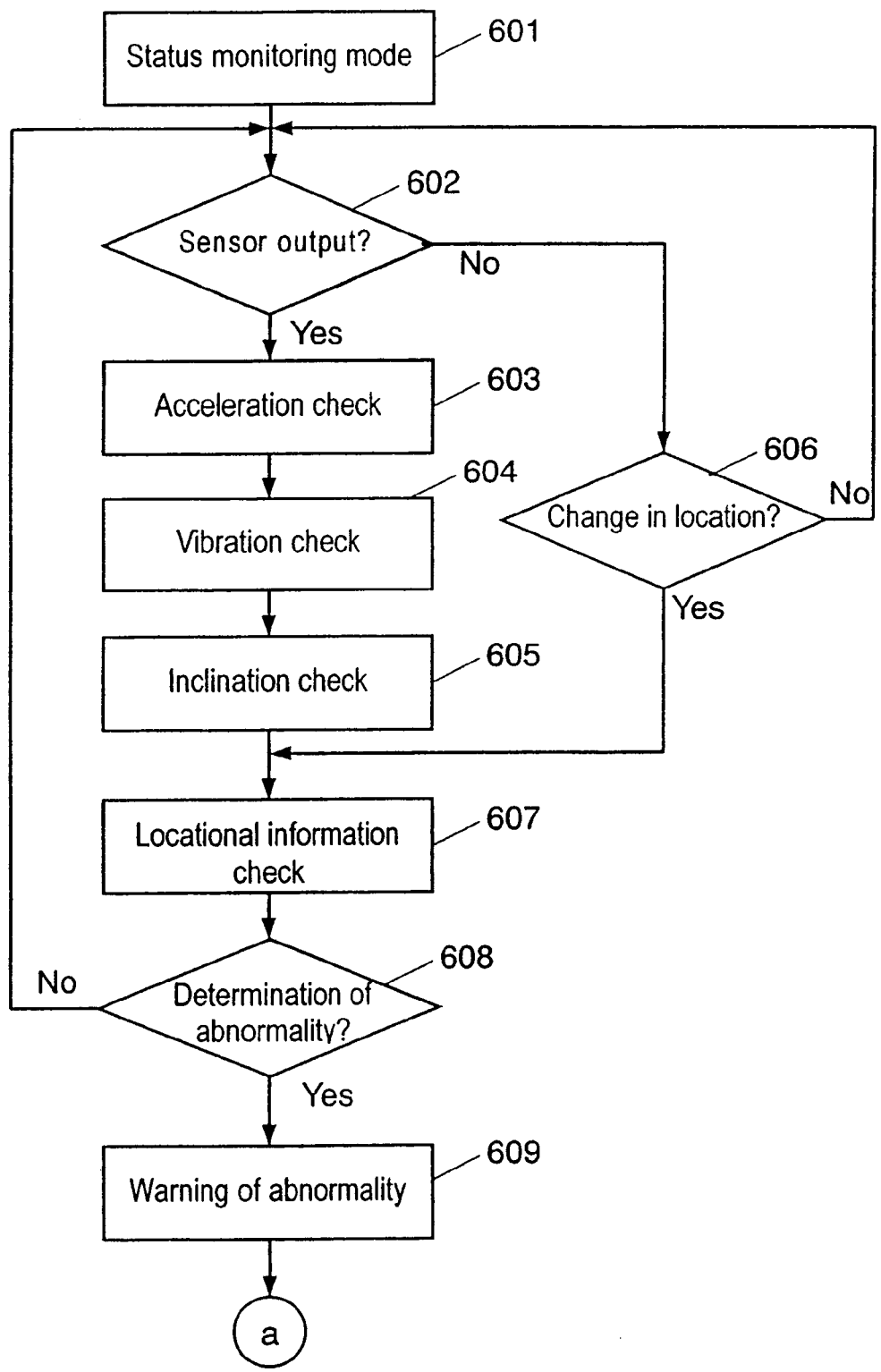
FIGS. 6A and 6B are flowcharts depicting a process of the wireless display personal computer of the second exemplary embodiment of the invention.
Figure 6B:
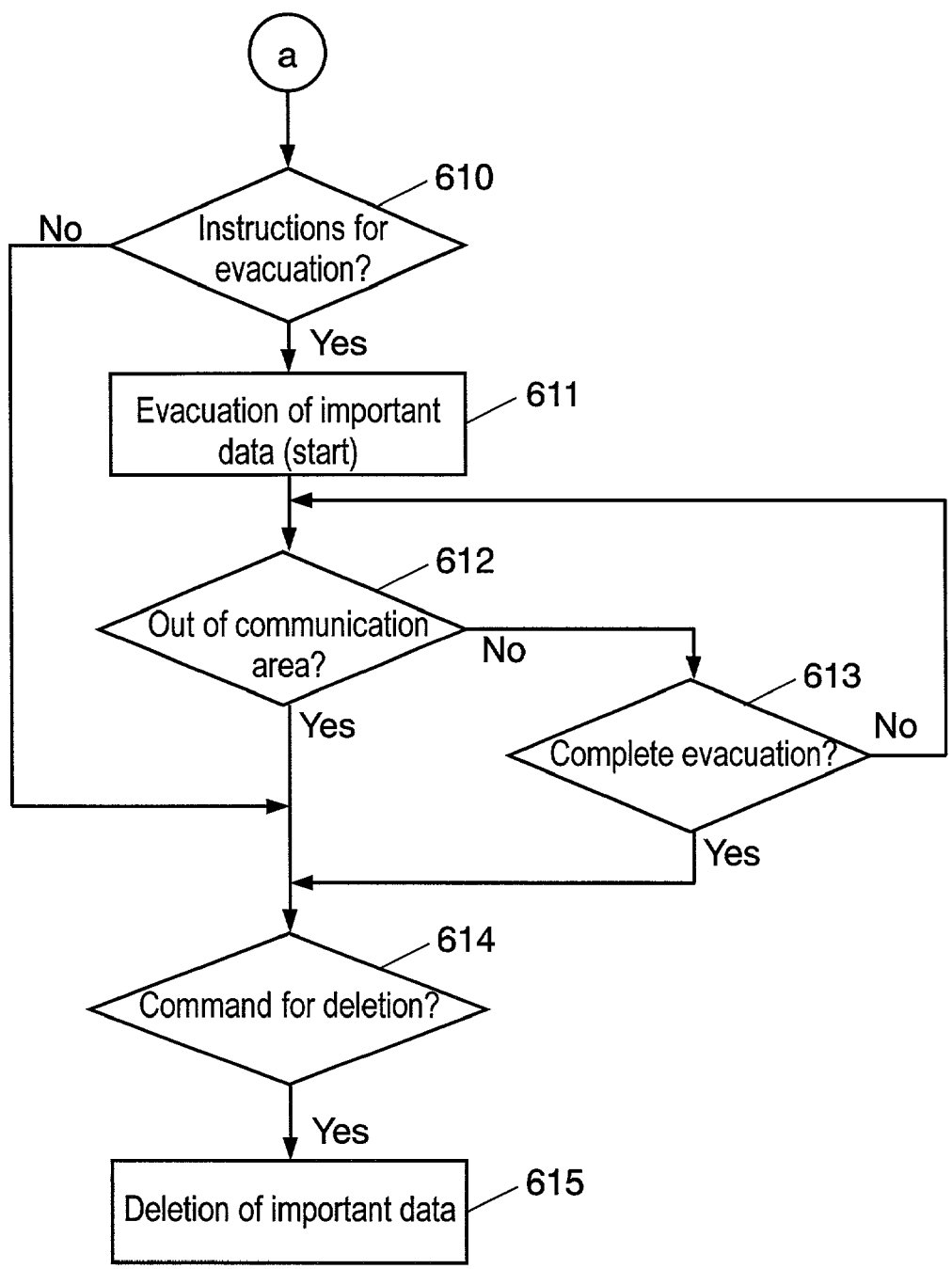

FIGS. 6A and 6B are flowcharts showing a process of the portable information-processing device, i.e., the wireless display PC, of this second exemplary embodiment of the invention. Referring now to the flowchart shown in FIGS. 6A and 6B, this exemplary embodiment will be described hereinafter.

Step 601: The data-processing device 401 of the wireless display PC goes into a status monitoring mode for judging a situating condition of it as to whether it is normal or abnormal.

The status monitoring mode may be initiated by the user choosing a mode selection by manipulating the touch panel 505 or the operating buttons 504, or the data-processing device 401 may be in the status monitoring mode from the initial setup. In the status monitoring mode, the data-processing device 401 activates the sensor 407 and the GPS module 408, and the CPU 403 monitors outputs of the sensor 407 and the GPS module 408.

Step 602: The CPU 403 determines if there is an output of the sensor 407. When the CPU 403 detects an output of the sensor 407, process of the steps 603 through 605 are executed. If no output is detected, there goes into the step 606.

Step 603 through 605: An output of the acceleration sensor, an output of the vibration sensor, and an output of the inclination sensor are checked at each of the steps. It then moves into the next step 607.

Step 606: A locational information output by the GPS module 408 is verified. If there is no change in location of the data-processing device 401, there goes back to the step 602, and continues monitoring the sensor 407 and the GPS module 408. If a location of the data-processing device 401 has changed, it then proceeds to the step 607 and checks for the change of the locational information.

Step 607: First, the data-processing device 401 transmits to the image display device 402 via the wireless communication unit 406 a command dictating transmission of a transition in location of the image display device 402. The image display device 402, upon reception of the command in the wireless communication unit 412, transmits to the data-processing device 401 via the wireless communication unit 412 the transition information of its own location covering a predetermined period of time acquired from the GPS module 415 and stored cumulatively in the memory 410 or the secondary storage device 411. The data-processing device 401, when it receives the transition information on location of the image display device 402, verifies changes in location of both the dataprocessing device 401 and the image display device 402, and a change in positional relation between the data-processing device 401 and the image display device 402.

In this embodiment here, although what has been adopted is the method in which the image display device 402 sends the transition information on its location in return to the command, the following method is also suitable. That is, the image display device 402 keeps transmitting locational information of its own to the data-processing device 401 at regular intervals. The data-processing device 401 stores the received locational information cumulatively in the memory 404 or the secondary storage device 405. It then verifies changes in the location as well as a change in the positional relation based on the accumulated information.

Step 608: Judgement is made for the situating condition of the data-processing device 401 as to whether it is currently normal or abnormal based on the check result of the output of the sensor 407 and the check result of the locational information output by the GPS module 408. In checking the acceleration, vibration, and change in inclination, judgments are made as to whether or not they exceed presumed ranges. In checking the change in locational information, judgement is made as to whether there has been any move beyond a presumed area.

It then proceeds to step 609 et seq. if judged abnormal based on these judgements. Or, it goes back to the step 602 if judged normal, and continues the monitoring with the sensor 407 and the GPS module 408.

Step 609: The data-processing device 401 sends a warning to the image display device 402 via the wireless communication unit 406, notifying that there is an abnormality with it. The image display device 402, upon reception of the warning via the wireless communication unit 412, displays the warning in the display unit 414.

Having seen the warning in display, the user is able to use the input unit 413 (the touch panel 505 or the operating buttons 504) on the image display device 402 to input instructions for evacuation of the important data as well as deletion of the important data. These instructions are transferred to the data-processing device 401 via the wireless communication unit 412.

Step 610: The data-processing device 401 proceeds to step 611 if it receives the instructions for evacuation. It proceeds to step 614 if it does not receive any instruction for evacuation.

Besides, if there is a presetting for an automatic data evacuation, it proceeds unconditionally to the step 611.

Step 611: There begins evacuation through the wireless communication unit 406 to the image display device 402, of the important data determined based on additional information such as priority information and range information pre-set by the user among the data stored in the memory 404 and the secondary storage device 405.

In this embodiment here, a priority level is added to an individual file as the priority information according to, for instance, newness of a time stamp of the file, if file system is used for the data management system of the data-processing device 401. In addition, a range information is added to, for example, a certain file or every file in a certain-directory.

Step 612: A status of the transmission is observed in this step 612.

If the evacuation is unable to be initiated, or when the transmission is interrupted in the midst of the evacuation in the step 611, there proceeds to step 614. In an instance, wherein a condition of the radio communication is checked and if the image display device 402, i.e. the destination device, is located outside of the communication range, there proceeds to the step 614.

Step 613: There proceeds to the step 614 when the evacuation is completed, or goes back to the step 612 if the evacuation is still in progress.

Steps 614 and 615: In the step 614, a confirmation is made as to whether or not the instructions for deletion of the important data has arrived from the image display device 402. When the data-processing device 401 receives the instructions for deletion of the important data via the wireless communication unit 406, it proceeds to the step 615 to execute deletion of the important data.

In addition, it also proceeds to the step 615 in the same manner even if it does not receive the instructions for deletion, if it is programmed with a setting for deletion of the data automatically.

There are other possible ways to constitute the radio communications between the data-processing device 401 and the image display device 402 used for the data evacuation destination in this exemplary embodiment, including direct communications, communications via an access point, and communications via a wireless public network. For the confirmation of transmission status in the step 612, it is appropriate to use a condition that a location of the access point is outside of the communication range in the case of communications via the access point, or that it is outside of a base station of the wireless public network in case of communications via the wireless public network.

(Third Exemplary Embodiment)

In a third exemplary embodiment, a portable information-processing device comprises a small base unit of personal computer and a remote controller.

Figure 7:
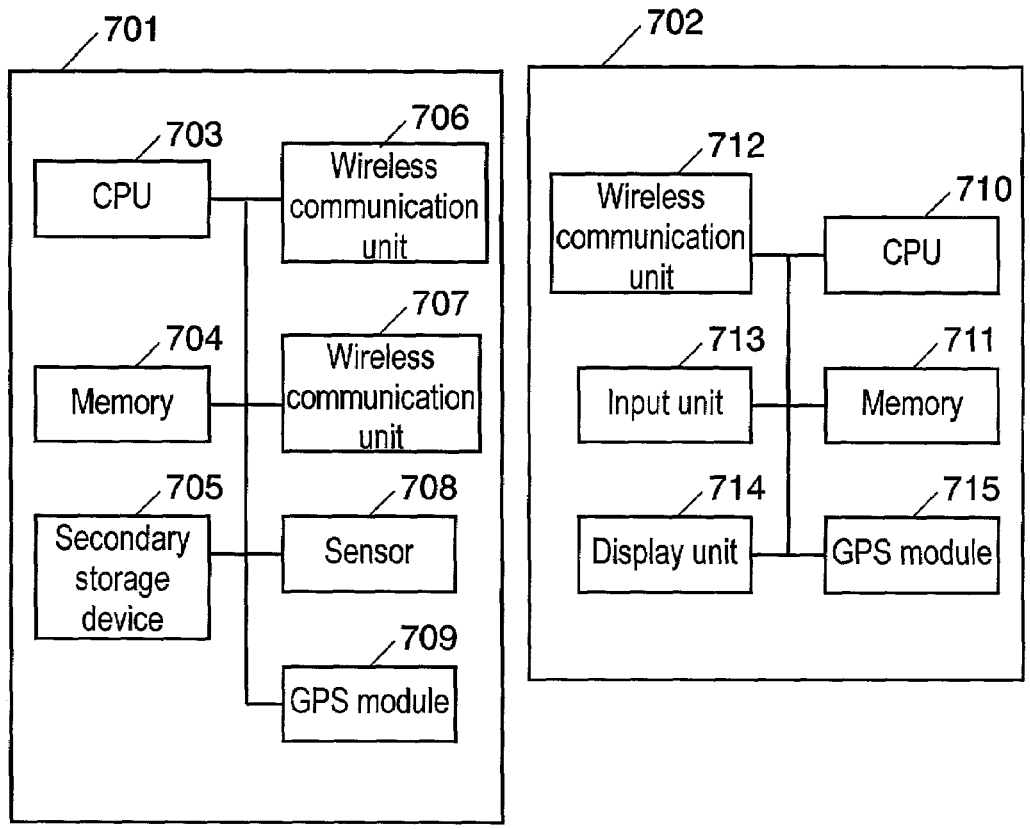
FIG. 7 is a block diagram showing a portable information-processing device of a third exemplary embodiment of the present invention.

FIG. 7 is a diagram showing a configuration of the portable information-processing device relative to the third exemplary embodiment of this invention.

In FIG. 7, a base unit device 701 (hereinafter referred to as PC base unit) actually processes data and transmits the processed outcome as a resultant ID to a portable control device 702 (hereafter referred to as remote controller). The remote controller 702 receives the resultant ID transmitted over-the-air by the PC base unit 701, and displays a message image corresponding to it. A CPU 703 defines a processor means of the PC base unit 701. The CPU 703 is connected with a memory 704, a secondary storage device 705, wireless communication units 706 and 707, a sensor 708, and a GPS module 709, and it controls them. The memory 704 and the secondary storage device 705 define storage means of the PC base unit 701, and they store data to be processed by the CPU 703 and the resultant data after the processing. The memory 704, in particular, temporarily stores codes to be processed by the CPU 703 and the processed data. The secondary storage device 705 is comprised of such a device as a HDD and a flash memory, and it stores the processed data and the like for a long-term basis. A wireless communication unit 706 and another wireless communication unit 707 define wireless communication means of the PC base unit 701. The wireless communication unit 706 carries out radio communications with the remote controller 702. In this exemplary embodiment, the techniques of Bluetooth and IEEE 802.11 may be used for the radio communications between the PC base unit 701 and the remote controller 702. In addition, the wireless communication unit 707 carries out radio communications with other information-processing devices either directly or through wireless public network. In this exemplary embodiment, the technique of IEEE 802.11, for instance, may be used for the direct radio communications.

In this exemplary embodiment, the remote controller 702 may be substituted with a cellular phone or a PHS terminal (personal handy phone).

The sensor 708 and the GPS module 709 serve status detector means for detecting and outputting a situating condition of the PC base unit 701. The sensor 708 comprises an acceleration sensor, a vibration sensor, and an inclination sensor, although they are not show in the figure. The sensor 708 detects a change in acceleration impressed on the PC base unit 701 itself, vibration of the PC base unit 701 in itself, and a change in inclination of the PC base unit 701 itself. Any sensors of ordinary type are useful for these various sensors in this exemplary embodiment. The GPS module 709 measures and determines a location of the PC base unit 701 using a satellite.

The CPU 703 judges whether a situating condition of the PC base unit 701 is in a normal situation or an abnormal situation according to an output of the status detector means. It can be determined from the above judgement as to whether or not the PC base unit 701 is in a situation of, for instance, being stolen.

A CPU 710 serves as a processor means of the remote controller 702. The CPU 710 is connected with a memory 711, a wireless communication unit 712, an input unit 713, a display unit 714, and a GPS module 715, and controls them. The memory 711 represents a storage means of the remote controller 702, and it temporarily stores codes and data to be processed by the CPU 710 as well as the resultant data after the process. The wireless communication unit 712 serves as a wireless communication means of the remote controller 702, and it carries out radio communications with the PC base unit 701.

Figure 8:
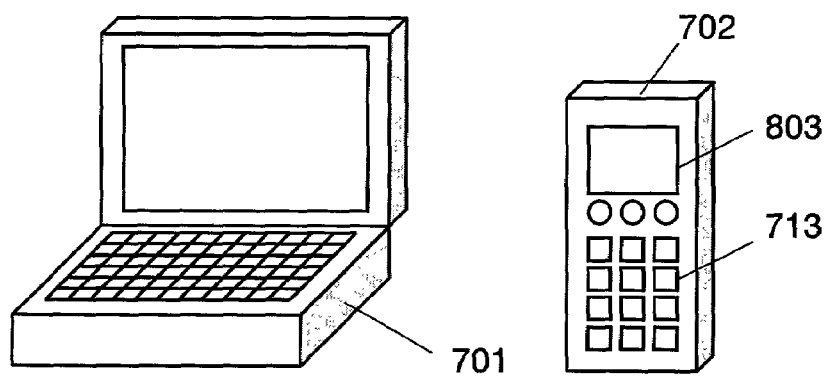
FIG. 8 is an illustration depicting the portable information-processing device of the third exemplary embodiment of the invention.

FIG. 8 is an illustration depicting an exterior view of the portable information-processing device of the third exemplary embodiment of this invention.

As shown in FIG. 8, an LCD panel 803 representing the display unit 714 and buttons of the input unit 713 are arranged on a front surface of the remote controller 702.

A flow of processes in this third exemplary embodiment is basically similar to that of the second exemplary embodiment, and it is shown in FIGS. 6A and 6B. This exemplary embodiment will now be described hereinbelow with reference to FIGS. 6A and 6B.

Step 601: The PC base unit 701 goes into a status monitoring mode for judging a situating condition of it as to whether it is normal or abnormal.

The status monitoring mode may be initiated by the user choosing a mode selection by manipulating the operating buttons in the input unit 713 on the remote controller 702, or the PC base unit 701 may be in the status monitoring mode from the initial setup. In the status monitoring mode, the PC base unit 701 activates the sensor 708 and the GPS module 709, and the CPU 703 monitors outputs of the sensor 708 and the GPS module 709.

Step 602: The CPU 703 determines if there is an output of the sensor 708. When the CPU 703 detects an output of the sensor 708, process of the steps 603 through 605 are executed. If no output is detected, there goes into the step 606.

Step 603 through 605: An output of the acceleration sensor, an output of the vibration sensor, and an output of the inclination sensor are checked at each of the steps. It then moves into the next step 607.

Step 606: A locational information output by the GPS module 709 is verified. If there is no change in location of the PC base unit 701, there goes back to the step 602, and continues monitoring the sensor 708 and the GPS module 709. If a location of the PC base unit 701 has changed, it then proceeds to the step 607.

Step 607: First, the PC base unit 701 transmits to the remote controller 702 via the wireless communication unit 706 a command dictating transmission of a transition in location of the remote controller 702. The remote controller 702, upon reception of the command in the wireless communication unit 712, transmits to the PC 701 via the wireless communication unit 712 the transition information of its own location covering a predetermined period of time acquired from the GPS module 715 and stored cumulatively in the memory 711. The PC base unit 701, when it receives the transition information on location of the remote controller 702, verifies changes in location of both the PC base unit 701 and the remote controller 702, and a change in positional relation between the PC base unit 701 and the remote controller 702.

In this embodiment here, although what has been adopted is the method in which the remote controller 702 sends the transition information on its location in return to the command, the following method is also suitable. That is, the remote controller 702 keeps transmitting locational information of its own to the PC base unit 701 at regular intervals. The PC base unit 701 stores the received locational information cumulatively in the memory 704 or the secondary storage device 705. It then verifies changes in the location as well as a change in the positional relation based on the accumulated information.

Step 608: Judgement is made for the situating condition of the PC base unit 701 as to whether it is currently normal or abnormal based on the check result of the output of the sensor 708 and a change in the locational information verified in the step 607. In checking the acceleration, vibration, and change in inclination, judgments are made as to whether or not they exceed presumed ranges. In checking the change in locational information, determinations are made as to whether (i) the PC base unit 701 has been moved beyond a presumed area, (ii) the PC base unit 701 has been moved irrelevant to a movement of the remote controller 702, and if they result in a such movement as to separate apart beyond a presumed distance between the PC base unit 701 and the remote controller 702.

It then proceeds to processes of step 609 et seq. if they are judged as being in an abnormal situation based on these determinations. Or, it goes back to the step 602 if judged as being in a normal situation, and continues the monitoring with the sensor 708 and the GPS module 709.

Step 609: The PC base unit 701 sends a warning to the remote controller 702 via the wireless communication unit 706, notifying that it is in the abnormal situation. The remote controller 702, upon reception of the warning via the wireless communication unit 712, displays the warning in the display unit 714.

Having seen the warning in display, the user is able to use the operating buttons of the input unit 713 on the remote controller 701 to input instructions for evacuation of the important data as well as deletion of the important data. These instructions are transferred to the PC base unit 701 via the wireless communication unit 712.

Step 610: The PC base unit 701 proceeds to step 611 if it receives the instructions for evacuation via the wireless communication unit 706. It proceeds to step 614 if it does not receive any instruction for evacuation.

Besides, if there is a presetting for an automatic data evacuation, it proceeds unconditionally to the step 611.

Step 611: There begins evacuation through the wireless communication unit 707 to other information-processing devices, of the important data determined based on additional information such as priority information and range information pre-set by the user among the data stored in the memory 704 and the secondary storage device 705.

In this embodiment here, a priority level is added to an individual file as the priority information according to, for instance, newness of a time stamp of the file, if file system is used for the data management system of the PC base unit. In addition, a range information is added to, for example, a certain file or every file in a certain directory.

Step 612: A status of the transmission is observed in this step 612.

If the evacuation is unable to be initiated, or when the transmission is interrupted in the midst of the evacuation in the step 611, there proceeds to step 614. In an instance, in which a condition of the radio communication is checked and if the other information-processing devices, or the destination devices, are located outside of the communication range, there proceeds to the step 614.

Step 613: There proceeds to the step 614 when the evacuation is completed, or goes back to the step 612 if the evacuation is still in progress.

Steps 614 and 615: In the step 614, a confirmation is made as to whether or not the instructions for deletion of the important data have arrived from the remote controller 702. When the PC base unit 701 receives the instructions for deletion of the important data via the wireless communication unit 706, it proceeds to the step 615 to execute deletion of the important data.

In addition, it also proceeds to the step 615 in the same manner even if it does not receive the instructions for deletion, if it is programmed with a setting for deletion of the data automatically.

There are other possible ways to constitute the radio communications between the PC base unit 701 of this exemplary embodiment and the other information-processing devices used for the data evacuation destinations, including direct communications, communications via an access point, and communications via a wireless public network. For the check of transmission status in the step 612, it is suitable to use a condition that a location of the access point is outside of the communication range in the case of communications via the access point, or that it is outside of a base station of the wireless public network in case of communications via the wireless public network. Furthermore, it may be possible to make any configuration via wireless means or transmission cables for connections between the access point and the other information-processing devices in the case of using the access point, and connections between the other information-processing devices and the wireless public network when using the wireless public network.

In the foregoing first through third exemplary embodiments, although the GPS is employed for acquisition of the locational information, other methods of finding locations are also acceptable as alternatives, such as cellular phones and PHS's that update locations with respect to base stations.

Moreover, although the acceleration sensor, the vibration sensor, and the inclination sensor are used, other configuration may be adoptable using any one or two sensors among them. With the present invention, as has been described in detail, there allows judgement of a situation of the portable information-processing device even if it is stolen, thereby realizing protection of confidentiality by evacuating data and deleting the data as much as possible. Furthermore, in the case of a wireless display PC, a device having a wireless remote controller, and the like, of which the device's base unit is operated from a remote location, there also realizes protection of confidentiality by evacuating data and deleting the data as much as possible, even if the base unit is stolen.

What is claimed is:

1. A portable information-processing device comprising:
   a processor means;
   a first storage means;
   a first wireless communication means; and
   a status detector means for detecting a situating condition and location of said portable information-processing device,
   wherein said status detector means includes:
   a location survey means for geographically identifying own location of said portable information-processing device; and at least one of
   an acceleration detector means for detecting acceleration of said portable information-processing device;
   a vibration detector means for detecting vibration of said portable information-processing device;
   an inclination detector means for detecting an inclination of said portable information-processing device,
   said processor means determines that said portable information-processing device is abnormal if at least one of shift values of location, acceleration, vibration and inclination of said portable information-processing device exceeds one of respective predetermined threshold values, and
   said first wireless communication means transmits the data stored in said first storage means to a pre-assigned device; when said processor means determines that said portable information-processing device is abnormal.

2. The portable information-processing device as set forth in claim 1, said portable information-processing device comprising a base unit device and a terminal device, wherein
   said base unit device includes:
   said processor means;
   said first storage means;
   said first wireless communication means; and
   said status detector means,
   said terminal device includes:
   a display means; and
   a second wireless communication means,
   wherein said status detector means detects a situating condition and location of said base unit device,
   said processor means determines that said base unit is abnormal if at least one of shift values of location, acceleration, vibration and inclination of said base unit exceeds one of respective predetermined threshold values,
   said first wireless communication means further transmits to said second wireless communication means a message representing abnormality, when said processor means determines the situating condition of said base unit device as being abnormal, and
   said terminal device displays on said display unit the message representing abnormality received in said second wireless communication means.

3. The portable information-processing device as set forth in claim 2,
   wherein said terminal device further includes a second storage means,
   said pre-assigned device is said terminal device, and
   said terminal device stores the received data of said first storage means into said second storage means.

4. The portable information-processing device as set forth in any one of claims 1, 2, and 3, wherein the data stored in said first storage means is deleted when the transmission of the data stored in said first storage means to said pre-assigned device is completed.

5. The portable information-processing device as set forth in any of claim 2 and claim 3,
   wherein said base unit device further includes a first location survey means for geographically finding own location,
   said terminal device further includes a second location survey means for geographically finding own location,
   said second wireless communication means transmits to said base unit device a locational information of said terminal device detected by said second location survey means, and
   said status detector means outputs a transition information for locational relation between said terminal device and said base unit device, according to the locational information of said terminal device received in said first wireless communication means and a locational information of said base unit device detected by said first location survey means.

6. The portable information-processing device as set forth in any of claims 1, 2 and 3, wherein the data stored in said first storage means is added with at least one additional information of priority information and data selection information, and said first wireless communication means transmit the data stored in said first storage means to said pre-assigned device according to said additional information.

7. The portable information-processing device as set forth in any of claim 2 and claim 3, wherein said terminal device further includes an input means for accepting a user to make an input manipulation, said second wireless communication means transmits to said first wireless communication means an operating data input to said input means, said base unit device transmits via said first wireless communication means to said second wireless communication means a processed data transacted according to said operating data received in said first wireless communication means, and said terminal device produces and displays on said display means an image data corresponding to said processed data received in said second wireless communication means.

8. The portable information-processing device as set forth in any of claim 2 and claim 3, wherein said terminal device includes an input means for accepting a user to make an input manipulation, said second wireless communication means transmits to said first wireless communication means an operating data input to said input means, said base unit device produces an image data corresponding to a data processed according to the operating data received in said first wireless communication means, and transmits the image data via said first wireless communication means to said second wireless communication means, and said terminal device displays on said display means the image data received in said second wireless communication means.

9. A method of evacuating data for portable information-processing device, said method comprising the steps of:

(a) detecting information for a situating condition and location of said portable information-processing device;

(b) determining that said portable information-processing device is abnormal if at least one of shift values of location, acceleration, vibration and inclination detected in said step (a) exceeds one of respective predetermined threshold values; and (c) transmitting via wireless means to a pre-assigned device a data stored in a storage means of said portable information-processing device, when the determination made in said step (b) is abnormal.

10. The method of evacuating data as set forth in claim 9, wherein said step (a) includes detection of information for a situating condition of a base unit device constituting said portable information-processing device.

11. The method of evacuating data as set forth in claim 9 further comprising the step of transmitting a message representing an abnormality via wireless means from said base unit device to a terminal device of said portable information-processing device, when the determination made in said step (b) is abnormal.

12. The method of evacuating data as set forth in claim 11, wherein said pre-assigned device is said terminal device.

13. The method of evacuating data as set forth in any one of claims 9, 10 and 11 further comprising the step of deleting the data stored in said storage means when the transmission of the data to said pre-assigned device is completed.

14. The portable information-processing device as set forth in claim 1, wherein said first wireless communication means transmits the data stored in said first storage means to said pre-assigned device according to a time stamp added to the data stored in said first storage means.

15. The portable information-processing device as set forth in claim 1, wherein said first wireless communication means transmits the data in a predetermined directory of said first storage means to said pre-assigned device.

16. The method of evacuating data set forth in claim 9, wherein in step (c), the data stored in said first storage means is transmitted to said pre-assigned device according to a time stamp added to the data stored in said first storage means.

17. The method of evacuating data set forth in claim 9, wherein in step (c), the data in a predetermined directory of said first storage means is transmitted to said pre-assigned device.

18. The method of evacuating data as set forth in any one of claims 9, 10 and 11 further comprising the step of deleting the data stored in said storage means, in any of events that transmission of the data to said pre-assigned device is not initiated, and that the transmission is interrupted.

* * * * *